April 5, 1932.   W. H. REES   1,852,376
WEIGHING APPARATUS
Filed Sept. 16, 1929   2 Sheets-Sheet 1
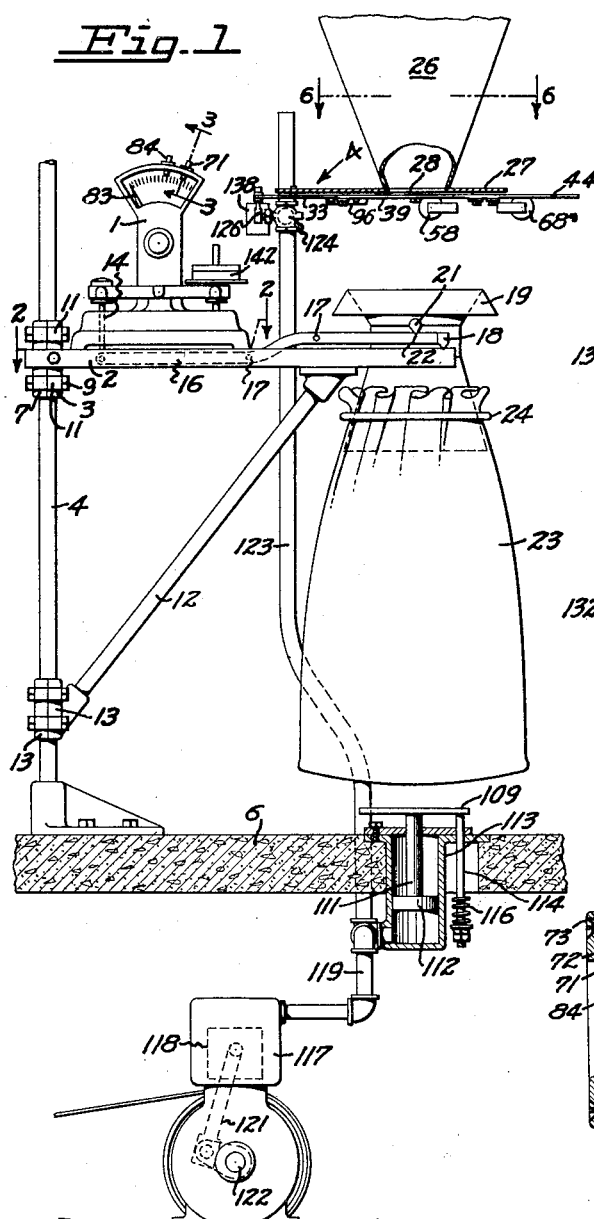
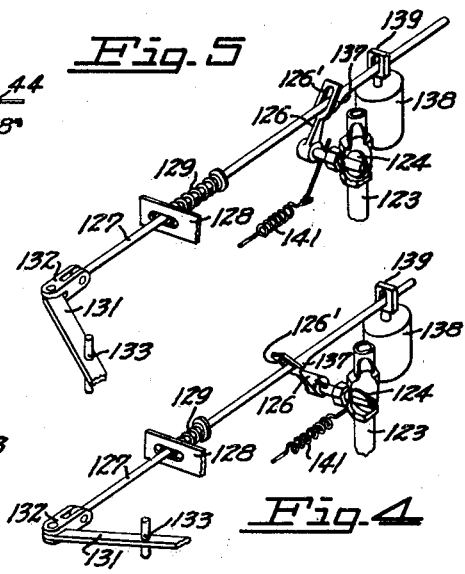
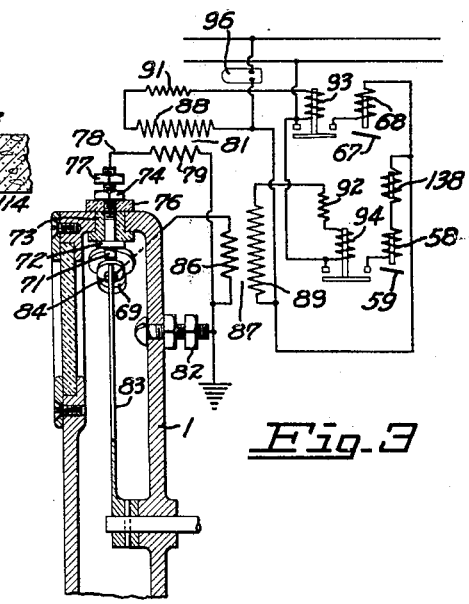
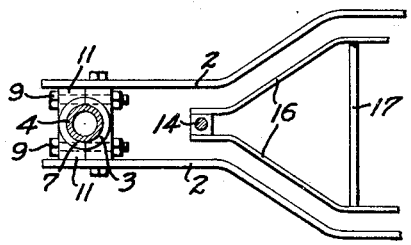
INVENTOR
WILLIAM H. REES
BY Charles S. Evans
HIS ATTORNEY April 5, 1932. W. H. REES 1,852,376
WEIGHING APPARATUS
Filed Sept. 16, 1929 2 Sheets-Sheet 2
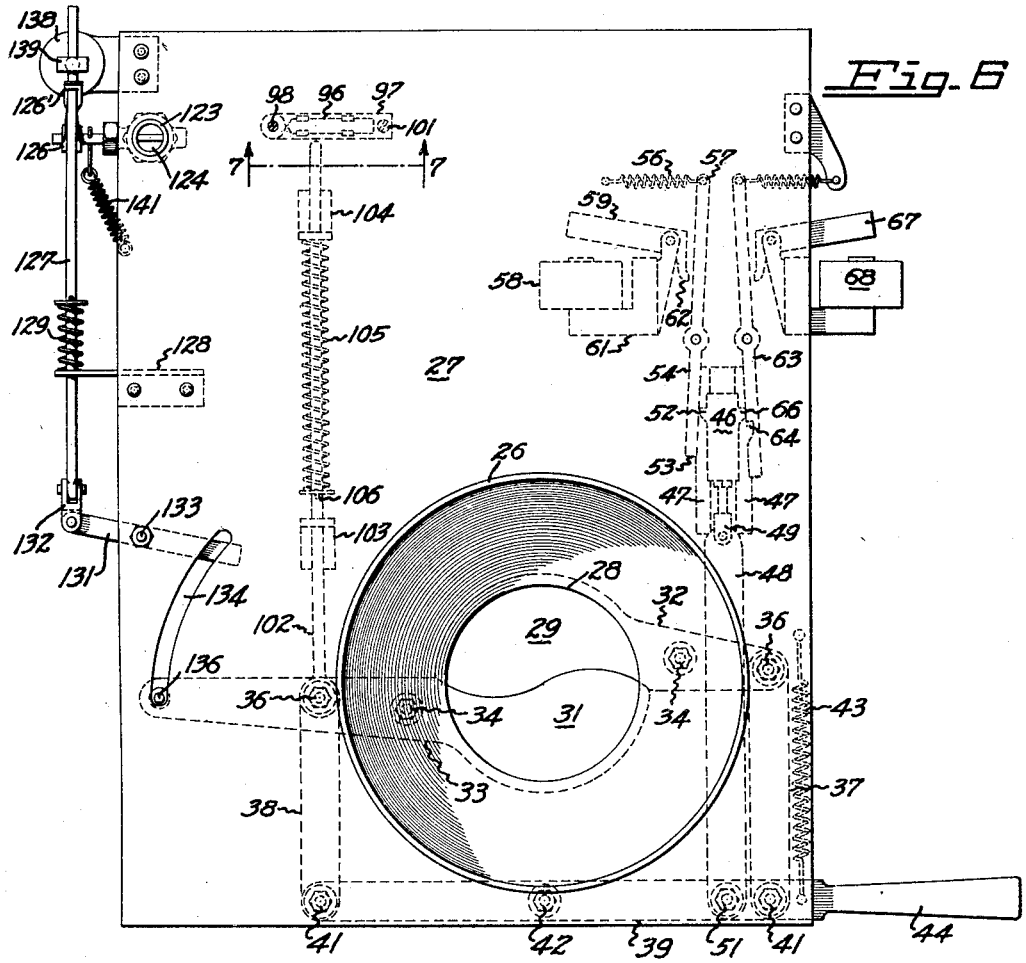
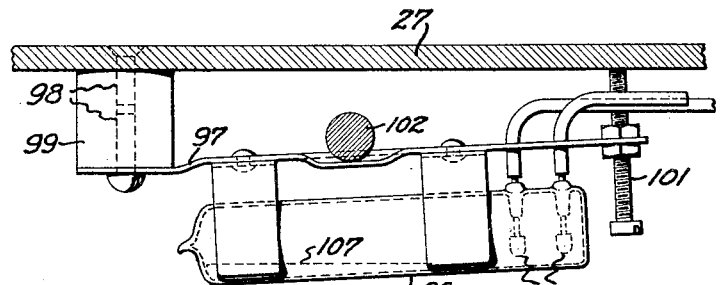
INVENTOR
WILLIAM H. REES
BY Charles S. Evans
HIS ATTORNEY Patented Apr. 5, 1932

1,852,376

UNITED STATES PATENT OFFICE

WILLIAM H. REES, OF BERKELEY, CALIFORNIA

WEIGHING APPARATUS

Application filed September 16, 1929. Serial No. 392,783.

This invention relates to weighing apparatus, and especially to apparatus for weighing flowable materials such as grain, cement or fertilizer.

One of the objects of the invention is the provision, in an apparatus of the character described, of means for vibrating or tamping the container in which material is being weighed, so that it will pack tightly in the container.

Another object of the invention is the provision, in an apparatus of the character set forth, of automatic means controlled by the operation of the scale for stopping the vibration of the container.

Another object of the invention is the provision, in an apparatus of the character described, of means for discharging material to be weighed into the container and means for stopping the discharge of material after a predetermined quantity is weighed.

Another object of the invention is the provision of means, in an apparatus of the character set forth, for stopping the vibration of the container before the predetermined weight has been obtained in order to prevent disturbance of the scale, and thereby effect accurate weighing.

Another object of the invention is the provision of means, in an apparatus of the character set forth, for reducing the flow of material into the container before the predetermined weight is obtained, to effect more accurate weighing than if the material were allowed freely to flow into the container in relatively large quantities just before the predetermined quantity is obtained.

A further object of the invention is the provision of a simple and inexpensive apparatus for performing the above functions.

My invention possesses other objects and valuable features, some of which will be set forth in the following description of the invention which is illustrated in the drawings forming part of the specification. It is to be understood that the invention is not limited to the showing made by the said description and drawings, as variant forms of the invention may be adopted within the scope of the claims.

Referring to the drawings:

Figure 1 is a front elevation of the apparatus, part of the view being shown in section to disclose the construction clearly.

Figure 2 is a fragmentary horizontal sectional view taken in a plane indicated by line 2—2 of Figure 1.

Figure 3 is an enlarged vertical sectional view taken in a plane indicated by line 3—3 of Figure 1; the control circuit is shown diagrammatically.

Figure 4 is a fragmentary isometric view of a portion of the apparatus, looking in the direction of arrow 4 of Figure 1.

Figure 5 is a view similar to that of Figure 4 but showing the elements in a different position.

Figure 6 is a horizontal sectional view taken in a plane indicated by line 6—6 of Figure 1.

Figure 7 is a vertical sectional view taken in a plane indicated by line 7—7 of Figure 6.

In broadly descriptive terms, the invention comprises a suitable scale upon which is supported a container, such as a sack into which material, such as fertilizer or grain, is discharged from a receptacle or hopper. Means is provided for vibrating or tamping the container so that the material will pack therein; and means, preferably controlled by the operation of the scale, is provided for stopping the discharge of material after a predetermined portion is weighed. Also, means, preferably controlled by the operation of the scale, are provided for stopping the vibration of the container and reducing the flow of the material from the receptacle or hopper, prior to the weighing of the predetermined quantity.

In greater detail, the apparatus comprises a scale 1 of any known or suitable construction, and mounted on a vertically adjustable support. The support comprises a pair of spaced bars 2, an end of each bar being fixed to the half sleeve 3, slidable on the upright 4, fixed to a suitable base, such as the floor 6. For holding the bars 2 in adjusted position, a half sleeve 7 is provided; and bolts 9, passing through the side bosses 11 of the half sleeves 3 and 7, secure the members in place.

To give stability to the structure, a brace 12 is secured, adjacent one end, to the bars 2; the other end of the brace being secured to the upright 4 by means of slidably adjustable half sleeves 13 mounted similarly to that of the half sleeves 3 and 7. By loosening the bolts, holding the half sleeves on the upright 4, the entire scale support may be vertically adjusted; and by tightening these bolts the support may be fixedly held in position. The purpose of the vertical adjustment is to accommodate containers of various sizes.

Pivotally connected, adjacent their ends, to the link 14 of the scale, are a pair of spaced levers 16 positioned between the bars 2 and rigidly connected by transverse bars 17. A suitable pin passing thru the ends of the levers 16 and the link 14 provides the pivot connection. The levers 16 are bent upwardly and are pivoted on the bars 2 by fulcrum pivots 18. An inverted funnel 19 is mounted on the levers 16. Preferably the funnel is pivotally mounted, by means of pins 21 projecting from the funnel and resting in the notches 22 cut in the levers 16, so as to permit swaying of a container supported on the funnel, when material is discharged into it, and thereby relieve strain on the scale. The container, such as the sack 23, is supported on the funnel by the ring 24 surrounding the funnel and of smaller diameter than the lower mouth thereof.

Means is provided for permitting discharge of material into the container. The material is held in a receptacle, such as the hopper 26, mounted on any suitable support. On the under side of the hopper, is mounted a plate 27 having an aperture 28 registering with the bottom opening of the hopper. With reference to Figure 6, aperture 28 may be opened or closed to control the flow of material by a pair of coacting gate portions 29 and 31 mounted on the underside of plate 27. These portions are semi-circular in shape, and have compound curved edges formed along their diameters, which match together when the gate portions are in a closed position to provide a closure for aperture 28. Portions 29 and 31 have formed on opposite portions of their peripheries the arms 32 and 33, pivotally mounted on the plate 27 by the bolts 34.

Hand operated means is provided for opening the gate when it is desired to begin the weighing operation. The outer portions of the arms 32 and 33 are pivotally connected, by means of pins 36, to the parallel links 37 and 38, which in turn are pivoted to the handle bar 39 by means of pins 41. Handle bar 39 is pivotally mounted on the plate 27 by means of pin 42; and a spring 43 connects the handle bar 39, at a point adjacent the handle 44 thereof, with the plate 27, so as normally to hold closed gate portions 29 and 31.

When the gate portions are opened, they are held substantially in an opened position by the trigger 46 slidably mounted on the underside of plate 27 is suitable guideways 47. The trigger is pivotally connected to a link 48 by a yoke member 49 of adjustable length; and link 48 in turn is pivotally connected to the handle bar 39 by the pin 51. In the open position of the gate portions, a catch 52, formed on one side of the trigger 46, engages the end 53 of the finger 54 which is pivotally mounted on plate 27, to thereby hold the gate open. Finger 54 normally bears against trigger 46, due to the action of a spring 56 connected between the finger end 57 and the plate 27. An electromagnet 58, of any suitable construction and having an armature 59 that is pivoted to magnet support 61, is mounted on the underside of plate 27 adjacent the finger 54. Armature 59 is provided with a hammer 62 adapted to strike against the finger when the magnet is excited, thus releasing the catch 52 and allowing the gate portions 29 and 31 to move toward the closing position.

Means are provided for allowing the gate portions to close partially, so as to reduce the flow of material. This is effected by a finger 63, similar to finger 54, but positioned on the opposite side of trigger 46. Finger 63 has a notch 64 therein adapted to engage a catch 66 on the trigger, as the gate portions move toward the closing position. In view of this, the gate portions are thus held partially open. An armature 67, cooperating with magnet 68, acts on finger 63 in a manner similar to that of armature 59 and magnet 58, to effect complete closing of the gate portions after they are held partially open.

Means, controlled by the operation of scale 1, are provided for releasing the trigger and catch arrangement to partially close the gate portions and finally completely close the gate portions, after predetermined quantities of material are weighed. The top of scale 1 is provided with a transversely extending slot 69, in which is positioned the electrode element 71 having the flange 72 between its ends. Electrode 71 is insulated from the scale by a bushing 73 interposed between the underside of the scale top and the flange 72; and it is clamped on the scale, in any predetermined position, by clamp nut 74 adapted to rest on the insulating washer 76 interposed between the scale top and the nut.

The electrode element 71 projects beyond the clamp nut 74; and on the projecting end, is threaded a contact nut 77 for clamping one end of the lead 78 connected with one end of a secondary coil 79 of the transformer 81. The other end of coil 79 is grounded on the scale through any suitable connection 82. An element of the scale separated from electrode 71 by a variable gap and movable in accordance with the load on the scale, such as the scale indicating hand 83, is also grounded to the scale in any suitable manner. A second electrode 84 is mounted, similar to electrode 71, and at any predetermined position in front of electrode 71, with respect to the movement of hand 83 as material is weighed. The secondary coil 86 of a second transformer 87, is connected to electrode 84 and the scale 1.

When an alternating current is applied to the primary coils 88 and 89 of the transformers 81 and 87 respectively, which transformers are so constructed preferably to induce in their secondaries a voltage of 6,000 to 8,000 volts, and the tip of scale hand 83 registers with or is in a position of minimum gap with respect to either of electrodes 71 or 84, a spark is caused to jump between electrodes 71 or 84 and hand 83, which hence serves as an electrode. This momentary closing of either of the secondary circuits, by the passing of a spark between the scale hand electrode and either of electrodes 71 or 84, causes the effective reactance of either transformer 81 or 87 to be reduced materially. As a result, sufficient current will pass primary coil 88 or 89, and current limiting coil 91 or 92 in series with the primary coils of transformers 81 and 87 respectively, so as to operate either relay 93 or 94 which are in series with the current limiting coils 91 and 92 respectively.

The relays and current limiting coils are of any conventional construction; the purpose of the current limiting coils being, of course, to limit the current flowing through the relays so that they may not be subjected to unnecessarily high and destructive surges of current.

Momentary closing of relay 94, due to the registration of electrodes 83 and 84, actuates magnet 58; hence armature 59 is attracted to cause its hammer to strike against finger 54, and thereby release trigger 46 when the gate portions are wide open.

Momentary closing of relay 93, due to the registration of electrodes 83 and 71, closes a circuit through magnet 68; hence armature 67 is attracted to cause its hammer to strike against finger 63, so as to release trigger 46 when the gate portions are partially open.

From the preceding description it is seen that when the gate portions 29 and 31 are held wide open, by means of trigger 46 and finger 54, material will flow from hopper 26 into container 23 on the scale. As the scale hand or electrode 83 moves from zero position it will pass toward electrode 84 which is set at any predetermined position. When electrode 84 and the scale hand register, finger 54 will be released in the manner previously described to permit partial closing of the gate portions 29 and 31. Complete closing of the gate portions will not obtain, due to the fact that catch 66 will engage in notch 64, in the backward movement of the trigger.

Material will thus flow into container 23 at a reduced rate; and when the scale hand 83 moves into registration with electrode 71, finger 63 will be actuated to release trigger 46, in the manner previously described, and allow complete closing of the gate. Electrode 71 is set at any predetermined position on the scale, in accordance with the desired quantity of the material to be weighed.

It is desirable to have an automatic control switch in series with the primary circuits including magnets 58 and 68, so that current will flow in the circuits only when necessary. A mercury switch 96, interposed in a lead coming from the source of current, as shown diagrammatically in Figure 3, is preferably employed. Mercury switch 96 is secured to a spring base 97, one end of which is fixed to and spaced from the underside of plate 27 by bolts 98 and spacer 99. The other end of the spring base normally bears against the plate 27, through the adjustable bolt 101, and in this position the switch is inclined so as to be open.

A rod 102, pivoted to the arm 33 by means of the pin 36, is slidably mounted on the plate 27 in the guide brackets 103 and 104, and is resiliently positioned by the spring 105 surrounding the rod 102 and compressed between the bracket 104 and pin 106 secured to the rod. The free end of the rod is normally adjacent the mercury switch when the gate portions 29 and 31 are in closed position; but when the gate portions are opened, the free end of the rod is of such length to pass over and bear down on the spring base 97, thus causing the switch 96 to tilt. Consequently mercury 107 will flow to bridge the contact points 108 and close the circuit, thus conditioning the control to operate either of the relays and hence energize magnet 58 or 68 when the proper electrodes register.

During the weighing of the material, it is desirable to have it pack tightly in the container 23 in order that the container may hold the maximum quantity; therefore means is provided for vibrating the container while the material is being weighed. Below the container 23 and mounted in an aperture of the floor 6, is a plunger adapted to strike against the container and thereby vibrate it.

The plunger comprises a plate 109 fixed to the top of rod 111, and connected to the piston 112 slidable in the cylinder 113. Upon application of intermittent pressure on piston 112, reciprocation of the plunger is effected, to vibrate the container 23. In order to yieldably limit upward movement of the plunger, a rod 114 is connected to the plate 109; and a spring 116 is interposed between the plate and the end of the rod.

Means is provided for applying intermittent fluid pressure on the piston 112 to reciprocate the plunger. A valveless air pump, which is otherwise of conventional construction, and comprising the cylinder 117 in which is slidable the piston 118, is connected with the cylinder 113 by conduit 119, joining the top of the pump cylinder with the bottom of the plunger cylinder. The pump piston is reciprocated, preferably at a rapid rate, by a connecting rod 121 journaled on the crank shaft 122, which is rotated by any suitable prime mover.

Leading into conduit 119 and thereby communicating with the cylinders 113 and 117, is a conduit 123 in communication with the atmosphere. A butterfly valve 124 is mounted in the conduit 123. When the valve is closed and the pump is in operation, the plunger will reciprocate to vibrate the container 23. However, when the butterfly valve 124 is open, reciprocation of the plunger does not occur, due to the fact that the pump cylinder is in communication with the atmosphere.

In order to effect accurate weighing of the material, it is desirable to stop vibration of container 23 and consequent vibration of scale hand 83, just before the container becomes filled with the desired quantity of material. For this purpose means is provided for stopping reciprocating of plunger rod 111 before the desired amount of material is in the container. The butterfly valve 124 is operated by a lever 126 having an eye 126' through which passes a rod 127 slidably mounted on plate 27 in the bracket 128, and resiliently held by the spring 129. Rod 127 is pivotally connected with the end of a lever 131 by the coupling 132, the lever 131 being pivotally mounted on the plate 27 by the pin 133. An arcuate guide slot 134 in the plate 27 is designed to permit engagement therein of a pin 136 secured to the free end of arm 33.

When the gate portions 29 and 31 are moved to wide open position, pin 136 is caused to engage against the free end of lever 131 and thereby move it, thus causing the rod 127 to move forward. A lug 137, formed on the rod and normally engaging the lever 126, moves forward with the movement of the rod 127, thereby causing lever 126 to move forward and valve 124 to close. This starts vibration of the plunger rod 111 in a manner previously explained.

Since it is desirable to stop the vibrating at a time prior to the complete filling of the container, it is convenient to provide means for doing this when the gate portions are being partially closed, thereby employing the same control means. A solenoid 138, of any suitable construction, is secured to the plate 27 and is connected in series with magnet 58 which effects partial closing of the gate portions. The solenoid has a plunger 139 therein adapted to lift the rod 127 upward when the solenoid is excited, thus disengaging lever 126 from lug 137 and allowing a spring 141 to open valve 124; hence stopping action of the plunger rod 111.

With reference to Figures 4 and 5, it is seen that when this happens, lever 126 may pass by lug 137 due to the formation of eye 126' in the lever. Almost simultaneously but just slightly after the backward movement of lever 126, and after the gate portions have moved toward the partially closed position, spring 129 will urge the rod 127 and lug 137 through the eye 126' of the lever, to set these portions in proper position for the weighing of the next batch of material. Lug 137 will ride through eye 126' since its under surface is inclined in the direction of rearward movement of rod 127.

In the operation of the weighing apparatus, considering that the air pump is being driven, the hopper 26 contains material and a container 23 is in place, a handle 44 of handle bar 39 is pulled forward until catch 52 engages the end 53 of finger 54. The gate portions 29 and 31 are now held in wide open position and material flows freely into the container. When the handle bar 39 is brought forward to open the gate portions, rod 127 is also moved forward, and engagement of lug 137 with the lever 126 causes the butterfly valve 124 to close, and the plunger rod 111 to reciprocate and vibrate the container 23. As material flows into the container, indicator hand 83 of the scale moves across the face until it registers with the electrode 84.

Relay 94 is then caused momentarily to close and simultaneously excite magnet 58 and solenoid 138. Magnet armature hammer 62 strikes against finger 54, thereby releasing trigger 46 so that it slides back to engage catch 66 with notch 64. This action effects a partial closing of the gate portions 29 and 31 so that material continues to flow into the container, but at a slower rate; also, the excitation of solenoid 138 causes its plunger to lift the rod 127 and disengage lever 126 to open valve 124, thereby stopping the action of plunger rod 111, and consequent vibration of the container, at the same time that the gates are partially closed.

Indicator hand 83 continues to move across the scale until it registers with the electrode 71. Relay 93 is now caused to operate so as to effect momentary excitation of magnet 68. This causes the hammer of armature 67 to strike against finger 63, and thereby release the trigger 46, hence permitting complete closing of the gate portions 29 and 31 to stop the flow of material.

After stopping of discharge of material into the container sack, the sack and the weighed contents therein are removed, and an empty sack is placed on the scale, the above cycle of operation being repeated. Preferably, the air pump for effecting reciprocation of plunger rod 111 when butterfly valve 124 is closed, is continuously operated during weighing of material.

If the quantity of material to be weighed is greater than the amount readable on the scale dial, counterweights 142 may be used with the scale, according to well known practice.

From the preceding description it is seen that since vibration of the container is stopped prior to the time when the predetermined quantity of material to be weighed is in the container, the scale hand is not vibrated and accurate weighing occurs. Also since the scale hand 83 is separated from the electrodes 84 and 71 by a variable gap, its free movement is not impeded; therefore there is no drag thereon.

I claim:

1. In an apparatus for weighing material, a scale, means on said scale for supporting a container in which the material is weighed, means for vibrating the container, and means controlled by the operation of the scale for stopping said vibrating means after a predetermined amount of material is weighed.

2. In an apparatus for weighing material, a scale, means on said scale for supporting a container in which the material is weighed, a receptacle having an aperture thru which material passes into the container, means for closing the receptacle aperture after a predetermined quantity of material is weighed, means for vibrating the container while material is being weighed, and means controlled by the weighing means for stopping said vibrating means prior to the closing of said receptacle.

3. In an apparatus for weighing material, a scale, means on said scale for supporting a container in which the material is weighed, a receptacle having an aperture thru which material passes into the container, means controlled by the operation of said scale for closing the receptacle aperture after a predetermined quantity of material is weighed, means for vibrating the container while material is being weighed, and means controlled by the operation of said scale for stopping said vibrating means prior to the closing of said receptacle.

4. In an apparatus for weighing material, a scale, means on said scale for supporting a container in which the material is weighed, a plunger adapted to strike against said container, a piston connected with said plunger, a cylinder within which the piston slides, and means for intermittently applying pressure against said piston to reciprocate the plunger and vibrate the container.

5. In an apparatus for weighing material, a scale, means on said scale for supporting a container in which the material is weighed, a plunger adapted to strike against said container, a piston connected with said plunger, a cylinder within which the piston slides, a conduit communicating with said cylinder, a valve in said conduit, and means for intermittently applying pressure against said piston to reciprocate the plunger and vibrate the container when the conduit valve is closed.

6. In an apparatus for weighing material, a scale, means on said scale for supporting a container in which the material is weighed, a plunger adapted to strike against said container, a piston connected with said plunger, a cylinder within which the piston slides, a conduit communicating with said cylinder, a valve in said conduit, means for intermittently applying pressure against said piston to reciprocate the plunger and vibrate the container when the conduit valve is closed.

7. In an apparatus for weighing material, a scale, means on said scale for supporting a container in which the material is weighed, a plunger adapted to strike against said container, a piston connected with said plunger, a cylinder within which the piston slides, a conduit communicating with said cylinder, a valve in said conduit, means for intermittently applying pressure against said piston to reciprocate the plunger and vibrate the container when the conduit valve is closed, and means controlled by the operation of said scale for opening said valve to stop the plunger after a predetermined quantity of material is weighed.

8. A vibrating mechanism comprising a plunger, a piston connected with said plunger, a cylinder within which the piston slides, a conduit communicating with said cylinder, a valve in said conduit, and means for intermittently applying pressure against said piston to reciprocate the plunger when the conduit valve is closed.

9. A vibrating mechanism comprising a plunger, a piston connected with said plunger, a cylinder within which the piston slides, a conduit communicating with said cylinder, a valve in said conduit, means for intermittently applying pressure against said piston to reciprocate the plunger when the conduit valve is closed, and means actuated by mechanism correlated for use with said vibrating mechanism for opening the valve to stop the plunger.

10. In an apparatus for weighing material, a scale having an element movable in accordance with the load thereon, a second element mounted on said scale in the path of movement of the movable element, an electric circuit including said elements, means on said scale for supporting a container in which material is weighed, means for vibrating the container, and means operative by the completion of the circuit when the elements register for stopping the vibrating means.

11. In an apparatus for weighing material, a scale having an element movable in accordance with the load thereon, a pair of elements mounted on said scale in the path of movement of the movable element, an electric circuit including said elements, means on said scale for supporting a container in which material is weighed, a receptacle having an aperture thru which material passes into the container, means for vibrating the container, means operative by the completion of the circuit when the movable element registers with one element of said pair of elements for stopping the vibrating means, and means operative by the completion of the circuit when the movable element registers with the second element of said pair for closing the receptacle aperture.

12. In an apparatus for weighing material, a scale, means on said scale for supporting a container in which the material is weighed, means for vibrating the container, and means controlled by the weighing means for conditioning the vibrating means for operation during only a portion of the weighing.

13. In an apparatus for weighing material, a scale, means on said scale for supporting a container in which the material is weighed, means for vibrating the container while material is being weighed, and means controlled by the weighing means for stopping said vibrating means prior to the final weighing.

14. In an apparatus for weighing material, a scale, means on said scale for supporting a container in which the material is weighed, means for vibrating the container while material is being weighed, and means controlled by the weighing means for stopping said vibrating means after a predetermined amount of material is weighed, said amount being less than the final amount weighed.

15. In an apparatus for weighing material, a scale, means on said scale for supporting a container in which the material is weighed, a plunger adapted to strike against said container, means for reciprocating the plunger to vibrate the container, and means controlled by the operation of the scale for stopping the plunger.

16. In an apparatus for weighing material, a scale, means on said scale for supporting a container in which the material is weighed, a plunger adapted to strike against said container, means for reciprocating the plunger to vibrate the container while material is being weighed, and means controlled by the weighing means for stopping said plunger after a predetermined amount of material is weighed, said amount being less than the final amount weighed.

17. In an apparatus for weighing material, a scale, means on said scale for supporting a container in which the material is weighed, a receptacle having an aperture thru which material passes into the container, means for closing the receptacle aperture after a predetermined quantity of material is weighed, means for vibrating the container while material is being weighed, and means controlled by the weighing means for stopping the vibrating means and for reducing the size of the receptacle aperture prior to the closing thereof.

In testimony whereof I have hereunto set my hand.

WILLIAM H. REES.